Sept. 9, 1958     J. S. WILLIAMSON ET AL     2,851,646
REVERSING RELAY FOR ELECTRIC MOTORS
Filed March 7, 1956
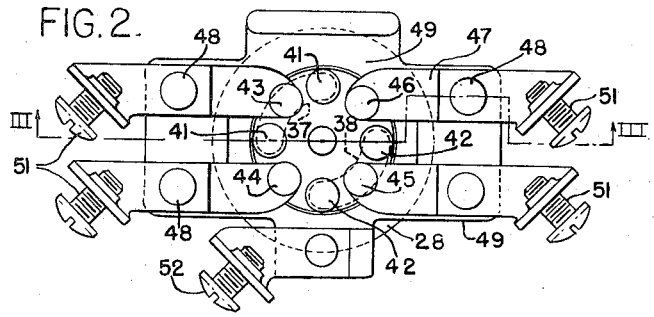
FIG. 2.
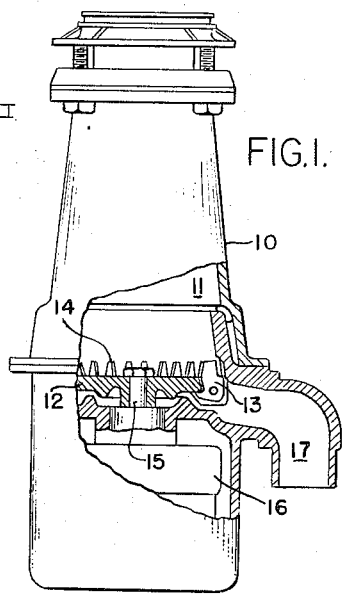
FIG. 1.
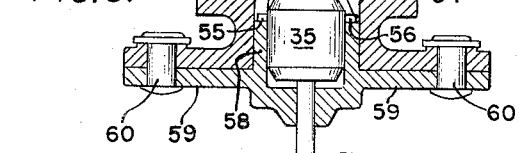
FIG. 3.
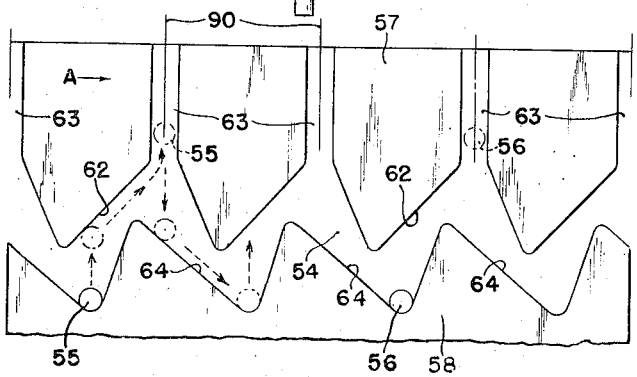
FIG. 4.
FIG. 5.
INVENTORS
JOHN S. WILLIAMSON,
KNUD J. HELSING.
BY Raymond J. Ridge
ATTORNEY

United States Patent Office 2,851,646
Patented Sept. 9, 1958

2,851,646
REVERSING RELAY FOR ELECTRIC MOTORS

John S. Williamson, Springfield, and Knud J. Helsing, Longmeadow, Mass., assignors to Westinghouse Electric Corporation, East Pittsburgh, Pa., a corporation of Pennsylvania Application March 7, 1956, Serial No. 570,136

4 Claims. (Cl. 318—207)

This invention relates to an electric relay construction and particularly to a reversing starting relay for an electric motor of the type having a running winding and a starting winding and it has for an object to provide an improved relay of this kind.

A further object of the invention is to reverse rotation of a motor of the type set forth each time it is started and also in the event that the motor is subjected to an excessive overload.

While the invention is applicable to various forms of electric motors, it is particularly adaptable for controlling split-phase or capacitor-start motors, energized from single-phase lines and driving apparatus susceptible of excessive overloads. An example of such application is the controlling of motors for waste food disposal apparatus. This type of apparatus may include a shredding or comminuting device having cutting edges which are effective, respectively, during rotation of the motor in either direction. In order to equalize wear on the cutting edges, the motor is periodically reverse. Furthermore, hard objects, such as bones or fruit pits, may become jammed against the shredder and stall the motor. This jammed condition may be removed by reversing the motor one or more times as is understood. The reversing of the motor, as set forth is carried out automatically by a motor starting switch constructed and arranged in accordance with this invention.

In practicing the invention, an electrically operated switch or relay is employed for controlling energization of the starting winding of the motor in accordance with the rate of energization of the running winding. The switch structure includes an electromagnetic coil in series with the running winding and having its movable core operating a reversing type switch connected in circuit with the starting winding. During starting, relatively high current in the coil closes the switch for energizing the starting winding. As the speed of the motor increases, the current in the running winding and coil decreases to a value at which the switch is opened for deenergizing the starting winding. The means for actuating the switch by the core includes a mechanism constructed and arranged in accordance with the invention for adjusting the switch each time it is cycled so that the polarity of the starting winding is reversed for reversing the direction of rotation of the motor.

If the rotor of the disposer becomes jammed for any reason, the starting relay remains closed and a conventional overload relay controlling the motor will operate to deenergize the motor. Upon reclosing of the overload relay, the starting relay again closes and reverses the polarity of the starting winding and the direction of rotation of the motor. The obstruction locking or jamming the rotor may not be effective with the motor reverse, so that normal operation is initiated. However, if the obstruction persists, the overload relay will again operate to deenergize and reenergize the motor, accompanied by a reversing operation of the starting relay. After one or more reversing operations of this kind, the obstruction may be removed and normal operation started. The user may also rapidly reverse the motor as often and as rapidly as desired by flipping the control switch off and on. If the jammed condition is not removed by one of these reversing cycles, the operator will deenergize the apparatus and employ other means for removing the obstruction causing the jammed condition.

The foregoing and other objects are effected by the invention as will be apparent from the following description taken in connection with the accompanying drawings, forming a part of this application, in which:

Fig. 1 is a view partially in elevation and partially in section of a waste food disposer having a motor controlled in accordance with the invention;

Fig. 2 is a plan view of a starting and reversing relay for controlling the motor of Fig. 1;

Fig. 3 is a section taken along the line III—III of Fig. 2;

Fig. 4 is a development of a detail as viewed from the axis of movement of the switch; and Fig. 5 is a diagram of the electrical connections for the motor and control relay.

Referring to the drawings, the invention is disclosed in connection with the driving motor of a waste food disposer shown in Fig. 1. The disposer includes a casing 10, the top of which is open and adapted for connection to the drain opening of a kitchen sink. The casing 10 encloses a shredding chamber 11, the bottom of which contains a rotary element or flywheel 12 carrying cutting or shredding members 13. The latter cooperate with suitable cutting edges 14 circumferentially spaced within the casing 10. The flywheel 12 is driven by a vertical shaft 15 of a motor 16. A discharge passage 17 communicates with the bottom of the chamber 11 for conveying water and comminuted refuse from the chamber 11 to a point of discharge, usually a sanitary sewer serving the premises. As is understood, the material to be disposed of is passed through the open top of the casing to the chamber 11 and a flow of water to the chamber 11 is initiated. The motor is energized for rotating the cutters 13 and the material being treated is shredded and carried out the drain passage 17 in the water discharged therethrough. The cutters 13 and the edges 14 cooperating therewith are effective to shred the refuse regardless of the direction of rotation of the cutters. The wear on the cutting edges of these members may be equalized by periodically reversing the motor 16 so that the life of the cutters 13 and the edges 14 is extended, all of which is well understood.

The motor 16 as disclosed is a single-phase capacitor motor having running and starting windings 18 and 19, respectively, connectible to a single-phase supply circuit indicated by line conductors L1 and L2. A condenser 21 may be connected in circuit with the starting winding 19 in order to provide current out of phase with the current in the main winding 18. The starting winding 19 is deenergized during running periods or when the speed of the the motor increases to a predetermined value during acceleration. Further description of this common type of motor is deemed unnecessary except that rotation of the motor may be changed by changing the polarity of one of its windings relative the other during starting. In the description which follows, the polarity of starting winding 19 is reversed relative the running winding for reversing the rotation of the motor. Operation of the motor 16 is controlled by a suitable master switch 22 and a conventional reclosing overload switch 23 is also provided to open the motor circuit in the event of an overload. The latter may be of the thermal type wherein a heater 24 in series with the motor 16 heats a bimetal switch 25 in accordance with the load on the motor. When an overload exists, the bimetal switch 25 is heated sufficiently to open and deenergize the motor. Upon cooling, the bimetal switch automatically closes, again energizing the motor. This switch 25 will cycle as long as the overload exists as is well understood. However, it will be understood that the overload switch may be of the manually closed type, wherein the attention of the operator is required to close the switch each time the switch is opened by an overload.

Control of energization of the starting winding 19 and also reversing of the motor 16 are effected by a relay constructed and arranged in accordance with this invention and now to be described. The relay preferably includes an insulating body or spool 28 having a coil 29 preferably wound in an annular space 31 on the exterior thereof. The spool 28 is provided with a chamber 32 in which the movable element 33 of a switch structure 34 is actuated along an axis by means of a magnetic core 35, the latter being in the field produced by the coil 29. It will be understood that the coil 29 may be disposed in any suitable manner relative the core 35 so long as the latter is subjected to the variable magnetic field produced by the coil 29. The coil 29 is energized at a rate corresponding to the rate of energization of the running winding 18 and is preferably connected in series therewith as seen in Fig. 5. When the winding 18 and coil 29 are deenergized and when conducting normal motor running current, the core 35 is held by gravity at its lowermost position below the coil 29 so that the switch 34 is open. During starting periods or overloads, the core 35 is moved upwardly by the strong field produced by the highly energized coil 29 in opposition to gravity, for the closing of the switch 34.

As shown, the movable element 33 of the switch 34 includes a plurality of arcuate, conducting bridging members 37 and 38 carried by an insulating disc 39. The latter is fixed in any suitable manner to the upper end of a stem 40 carried by and movable with the core 35. The bridging member 37 is riveted or otherwise secured to the disc 39 by contacts 41 extending through the disc 39 to its upper side and the bridging member 38 is similarly secured to the disc 39 by contacts 42. The switch 34 includes four stationary contacts 43 to 46, inclusive, carried by respective resilient springs 47 riveted, or otherwise fastened, as shown at 48, to a flange 49 at the top of the spool 28. Suitable terminals 51 are provided for the contacts 43 to 46, respectively. An additional terminal 52 suitably supported by the spool 28 is connected to one end of the coil 29, the opposite end of which is connected to the contact 43, as shown in Fig. 5.

Referring to Fig. 5, it will be noted that the opposed contacts 43 and 45 connect with the respective line conductors L1 and L2, the former connection including the overload switch 23 and master switch 22 in series. The opposed contacts 44 and 46 are connected to terminals of the starting winding 19 through its condenser 21. As the bridging contacts 37 and 38 are moved 90 degrees during each operation of the relay, as described later, they connect different opposite pairs of stationary contacts 43 to 46, inclusive, upon each successive operation. Accordingly, the switch 34 functions as a reversing switch for changing polarity of the starting winding 19 upon each cycle of operation of the switch 34. As the main running winding is not controlled by the switch 34, being under control of the master switch 22 only during normal operation, its polarity is unchanged so that the motor 16 is reversed each time the switch 34 is cycled. The means for actuating the bridging contacts through the 90 degrees set forth above will now be described.

The switch 34 is shown in its open position in Figs. 2 and 3 and in its closed position in Fig. 5. It will be noted that, in the open position (Fig. 2), the bridging members 37 and 38 are about 45 degrees out of alignment with the fixed contacts 43 to 46, inclusive. When the core moves upwardly to close the switch 34, the movable element 33, including the bridging members 37 and 38, is first actuated angularly about the axis of movement until the contacts 41 and 42 of the bridging members 37 and 38 are aligned with the fixed contacts 43 to 46, inclusive, and then, during the final stage of the closing movement, the element 33 moves axially to engage the movable and fixed contacts. When the switch is opened by downward movement of the core 35, the contacts 41 and 42 are moved, first axially out of engagement with the fixed contacts 43 to 46, inclusive, and then angularly about the axis to a position 45 degrees removed from the fixed contacts. Accordingly, the movable contacts are actuated angularly about the axis 90 degrees during a complete cycle of operation. The means for carrying this operation of the movable element 33 into effect includes a groove 54, preferably formed within the spool 28 and defining a track for a pair of pins 55 and 56 projecting radially from the core 35 along the diameter thereof.

The groove is formed in part by a cylindrical portion 57 of the spool 28 and in part by a sleeve 58 extending upwardly within the spool 28. The sleeve 58 includes lateral arms 59 secured, as by rivets 60, to the lower end of the spool. The bottom of the sleeve 58 is closed except for a small guide opening for a stem 61 projecting downwardly from the core 35. The groove formation is best understood by reference to Fig. 4 which is a development of the cylindrical portion 57 of the spool 28 and the sleeve 58 as viewed from the axis of movement of the core 35. It will be noted that the groove 54 undulates in the direction of the axis so that a twisting movement is imparted to the pins 55 and 56 as the core 35 moves axially under the influence of the coil 29. In the open position of the switch 34, the pins 55 and 56 rest on the bottom of opposite undulations of the groove 54. When upward movement is imparted to the core, the pins 55 and 56 engage upper sloping wall portions of the groove, indicated at 62, and are moved angularly 45 degrees thereby in the direction of the arrow A in Fig. 4 and about the axis of movement. This, of course, aligns the movable contacts 41 and 42 with the stationary contacts 43 to 46, inclusive, the bridging members 37 and 38 being positioned for the bridging of contacts 43 and 46, as well as 44 and 45. The angular movement of the pins 55 and 56 and the movable switch element 33 is always in the direction of the arrow A (Fig. 4) and clockwise as view in Figs. 2 and 5. The aligning movement of the switch element 33 just described occurs during the major portion of the upward travel of the core but does not engage the movable contacts 41 and 42 with the stationary contacts 43 to 46, inclusive. This engagement is effected by axial movement only of the element 33, or when the pins 55 and 56 ride into extensions 63 of each undulation of the groove. These extensions 63 are parallel to the axis. In the closed position of the switch 34, the pins 55 and 56 are indicated in broken lines within opposite extensions 63 (Fig. 4).

Opening of the switch 34 is effected by initial downward movement of the core 35, the pins moving axially only from the groove extensions 63. Toward the end of the opening stroke, the pins 55 and 56 engage sloping bottom edges 64 of the groove and ride thereon to the bottom of the groove. This latter movement imparts a 45 degree movement to the movable switch element 33 clockwise as viewed in Fig. 2. The travel of the pin 55 in the groove during a closing and opening of the switch 34 is represented by small broken arrows in Fig. 4. In the embodiment of the invention disclosed, the pins 55 and 56 are carried by the movable core and the grooves are formed in the relay body, but it is believed apparent that the pins 55 and 56 might be fixed in the body of the relay and the undulating grooves formed in the core or some element movable therewith.

From the foregoing, it will be apparent that the relay effects a reversal of the motor 16 each time the motor is started, either normally by the master switch 22 or, following a severe overload, by the overload switch 23. In Fig. 5, a starting is being effected with the bridge 37 connecting contacts 43 and 44, and bridge 38 engaging contacts 45 and 46. Upon the next starting operation, bridging member 37 connects contacts 43 and 46 while contacts 44 and 45 are bridged by member 38. Accordingly, the polarity of starting winding 19 is reversed relative the polarity of running winding 18, which is not controlled by the relay, and the rotation of motor 16 is, therefore reversed, all of which is well understood. Since different opposed pairs of the stationary contacts are bridged upon successive operations of the relay, as just described, a reversal of the motor occurs on each operation of the relay. As set forth heretofore, this operation is very desirable where the motor drives a shredding mechanism of the class described as the wear on the shredders is equalized. Also, the conditions causing a jammed or locked rotor are usually corrected by a reversal of the motor when the relay closes because of the heavy current in coil 29 caused by the overload, or when the overload switch recloses following the overload.

It is to be noted that, if the motor is running and an obstruction caused an overload, the increased current in the running winding of the motor and coil 29 will effect closing of the relay switch 34 immediately with reversal of the motor. This is true whether the overload causes the motor to stop or merely slow down. At any time during operation of the motor the relay will close its switch 34 and reverse the motor if the running winding current attains the value at which the relay closes. It is pointed out that, when the relay closes its switch because of an overload and while the motor is running, the reversing of a motor of the type set forth is exceptionally rapid.

The novel relay construction described heretofore, while particularly applicable for the reversing of a motor, may be employed in other applications where a predetermined sequence of switching operations is carried out. In the embodiment disclosed, the movable switching member is actuated 90 degrees for each closing operation thereof, but the pin and groove switch advancing mechanism may be readily altered to provide a greater number of switching operations during a 360 degree movement of the switching member. For example, the movable switch member may be moved only 60 degrees during a switching operation so that a sequence of six switching operations may be obtained during a complete 360 degree movement of the switching member.

While the invention has been shown in but one form, it will be obvious to those skilled in the art that it is not so limited, but is susceptible of various changes and modifications without departing from the spirit thereof.

What is claimed is:

1. In a reversing starting switch construction for a motor having a running winding and a starting winding, the combination of an electromagnetic coil connected in series relation with said running winding, a core associated with the coil and moved lineally along an axis in one direction when the coil is energized at a predetermined high rate during starting of the motor and in a second direction along said axis when the rate of energization of the coil is reduced to a lower value during running periods of the motor, a switch controlling the starting circuit and including a plurality of stationary contacts arranged in a plane normal to said axis, a pair of bridging contacts movable with said core into engagement with respective opposed pairs of stationary contacts when said core is actuated in said first direction, said bridging contacts being disengaged from the stationary contacts when said core is moved in said second direction, and means for moving said pair of bridging contacts angularly about said axis during movement thereof through said first and second directions so that a different pair of opposed stationary contacts are bridged for changing polarity of said starting winding relative the running winding in each succeeding operation of the switch.

2. In a reversing starting switch construction for a motor having a running winding and a starting winding in parallel therewith, the combination of an electromagnetic coil connected in series with said running winding, a core moved lineally upwardly along an axis by said coil when the motor starting current flowing therein is at a relatively high value, said core moving downwardly along said axis when the current flowing in the coil is reduced to a relatively low running value, switch means controlling the starting winding and having a plurality of fixed contacts arranged in a square in a plane normal to said axis, a pair of movable bridging contacts actuated by said core into engagement with respective opposed pairs of fixed contacts during upward movement of the core for energizing the starting winding of the motor, said bridging and fixed contacts being disengaged during downward movement of the core for deenergizing the starting winding during running periods, a sleeve structure surrounding said core and having a groove therewithin facing said core, said groove undulating in the direction of the axis, and a pin extending radially outwardly from the core and riding in said groove, said groove being formed to actuate the core and bridging contacts angularly about the axis in a single direction during said lineal movements of the core, said bridging contacts engaging different pairs of fixed contacts for each succeeding operation of the switch means so that the polarity of the starting winding relative the running winding and the direction of rotation of the motor are changed.

3. The combination as claimed in claim 2 wherein said groove includes an extension from each undulation thereof parallel to said axis in which the pin is disposed during the instant that the bridging contacts and the fixed contacts are engaged and disengaged, whereby these operations are effected solely by lineal movement of the bridging contacts along said axis.

4. In an electromagnetically operated switching device, the combination of a body structure, an electromagnetic coil carried thereby, a magnetic core supported by the body for movement along an axis under the influence of the field produced by the coil, said core being biased for movement in one direction to a first position and actuated in the opposite direction to a second position responsive to energization of the coil, a switch including a plurality of pairs of stationary contacts arranged in a plane normal to said axis and about the axis, a pair of bridging contacts fixed to the core for movement therewith into engagement with respective opposed pairs of stationary contacts when the core is actuated to said second position thereof, said bridging contacts being disengaged from the stationary contacts when the core is actuated to its first position and means for moving said core and bridging contacts angularly about said axis in the same direction during movement of the core in both directions of axial movement thereof, the construction and arrangement being such that a different pair of stationary contacts are bridged in each succeeding operation of the switch.

References Cited in the file of this patent

UNITED STATES PATENTS

| | | |
|---|---|---|
| 1,239,114 | Kroger | Sept. 4, 1917 |
| 1,644,171 | Caldwell | Oct. 4, 1927 |
| 1,732,577 | Durdin | Oct. 22, 1929 |
| 1,766,600 | Caruso | June 24, 1930 |
| 1,824,973 | Wescott | Sept. 29, 1931 |
| 2,528,520 | Jackson et al. | Nov. 7, 1950 |
| 2,701,855 | Hammes | Feb. 8, 1955 |
| 2,762,004 | Shepardson | Sept. 4, 1956 |